United States Patent [19]
Wortman et al.

[11] Patent Number: 5,771,328
[45] Date of Patent: Jun. 23, 1998

[54] LIGHT DIRECTING FILM HAVING VARIABLE HEIGHT STRUCTURED SURFACE AND LIGHT DIRECTING ARTICLE CONSTRUCTED THEREFROM

[75] Inventors: David L. Wortman, St. Paul; Sanford Cobb, Jr., St. Mary's Point, both of Minn.; Mark E. Gardiner, Santa Rosa, Calif.

[73] Assignee: Minnesota Mining and Manufacturing Company, St. Paul, Minn.

[21] Appl. No.: 832,132

[22] Filed: Apr. 3, 1997

Related U.S. Application Data

[63] Continuation of Ser. No. 400,052, Mar. 3, 1995, abandoned.

[51] Int. Cl.$^6$ .................................................. G02B 6/10
[52] U.S. Cl. ........................... 385/146; 385/36; 385/901; 359/834; 359/837; 349/62; 349/65
[58] Field of Search .................................... 385/146, 147, 385/901, 36; 359/831, 833, 834–836, 528, 837; 362/309, 327, 339, 32; 428/30; 349/57, 62, 64, 65

[56] References Cited

U.S. PATENT DOCUMENTS

| | | | |
|---|---|---|---|
| 3,873,184 | 3/1975 | Heenan | 350/103 |
| 3,988,609 | 10/1976 | Lewin | 240/106 R |
| 4,242,723 | 12/1980 | Fabbri et al. | 362/33 |
| 4,497,860 | 2/1985 | Brady, Jr. | 426/156 |
| 4,542,449 | 9/1985 | Witehead | 362/330 |
| 4,563,613 | 1/1986 | Genovese et al. | 313/497 |
| 4,748,546 | 5/1988 | Ukrainsky | 362/223 |
| 4,791,540 | 12/1988 | Dreyer, Jr. et al. | 362/331 |
| 4,799,137 | 1/1989 | Aho | 362/309 |
| 4,805,984 | 2/1989 | Cobb, Jr. | 385/133 |
| 4,874,228 | 10/1989 | Aho et al. | 362/23 |
| 4,883,341 | 11/1989 | Whitehead | 359/601 |
| 4,902,929 | 2/1990 | Toyoda et al. | 313/503 |
| 4,906,070 | 3/1990 | Cobb, Jr. | 359/834 |
| 4,952,023 | 8/1990 | Bradshaw et al. | 359/529 |
| 5,056,892 | 10/1991 | Cobb, Jr. | 359/831 |
| 5,131,877 | 7/1992 | Mathumoto | 445/24 |
| 5,175,030 | 12/1992 | Lu et al. | 428/30 |
| 5,206,746 | 4/1993 | Ooi et al. | 359/40 |
| 5,237,641 | 8/1993 | Jacobson et al. | 385/146 |
| 5,247,226 | 9/1993 | Sato et al. | 313/504 |
| 5,247,390 | 9/1993 | Hed | 359/599 |
| 5,262,880 | 11/1993 | Abileah | 359/40 |

(List continued on next page.)

FOREIGN PATENT DOCUMENTS

| | | |
|---|---|---|
| 762769 | 12/1956 | United Kingdom . |
| 95/34009 | 12/1995 | WIPO .............................. G02B 6/00 |

OTHER PUBLICATIONS

Commercial literature, 3M Instruction Sheet No. 78–8063–2625–8, Instructions for Field Change for 3M–IR–Compatible Safelight Kit, IFC No.: 831/952–20, Jan. 1989, pp. 1–7.

Commercial literature, entitled 3M IR Safelight, Medical Imaging Systems, Imaging Systems Group, 3M Health Care, St. Paul, MN 1991, pp. 1–2 no month.

McCartney et al., Article entitled "S7-7 Directional Diffuser Lens Array for Backlit LCDs", Honeywell Inc., presented at the Japan Display '92 Converence, pp. 259–262 no month.

*Primary Examiner*—Rodney B. Bovernick
*Assistant Examiner*—Hemang Sanghavi
*Attorney, Agent, or Firm*—Jed W. Caven; Stephen W. Buckingham; Stephen C. Jensen

[57] ABSTRACT

A light directing film including a first surface and a second structured surface. The structured surface includes a repeating pattern of prism zones including at least a first zone having a plurality of prism elements with peaks disposed at a first distance from a reference plane and a second zone having a plurality of prism elements with peaks disposed less than the first distance from a reference plane. The width of the first zone preferably measures less than about 300 microns.

10 Claims, 3 Drawing Sheets

U.S. PATENT DOCUMENTS

| | | | |
|---|---|---|---|
| 5,280,371 | 1/1994 | McCartney, Jr. et al. | 359/40 |
| 5,281,489 | 1/1994 | Mori et al. | 428/690 |
| 5,303,322 | 4/1994 | Winston et al. | 385/146 |
| 5,304,895 | 4/1994 | Ujihara | 315/72 |
| 5,306,441 | 4/1994 | Reddy et al. | 252/301.4 |
| 5,359,691 | 10/1994 | Tai et al. | 385/146 |
| 5,363,470 | 11/1994 | Wortman | 385/147 |
| 5,390,276 | 2/1995 | Tai et al. | 385/146 |
| 5,467,208 | 11/1995 | Kokawa et al. | 385/146 |
| 5,471,348 | 11/1995 | Miller et al. | 359/837 |
| 5,506,929 | 4/1996 | Tai et al. | 385/146 |
| 5,557,836 | 9/1996 | Smith et al. | 29/527.4 |
| 5,564,870 | 10/1996 | Benson et al. | 409/131 |

ID_LIGHT DIRECTING FILM HAVING
VARIABLE HEIGHT STRUCTURED
SURFACE AND LIGHT DIRECTING
ARTICLE CONSTRUCTED THEREFROM

This is a continuation of application Ser. No. 08/400,052 filed Mar. 3, 1995, now abandoned.

FIELD OF THE INVENTION

The present invention relates generally to light directing films. In particular, the present invention relates to light directing films having a variable height structured surface and to a light directing article constructed therefrom.

BACKGROUND

Some optical display designers have adopted the practice of using light directing film to increase the amount of light exiting an optical display in a direction approximately normal, or 'on axis', to the surface of the display. One commonly used light directing film has a substantially planar surface and an opposing structured surface which includes an array of linear prisms. Increasing the amount of on axis light reduces the amount of energy required to generate a desired on axis luminance. This feature becomes particularly important if the optical display includes a light source which is driven by battery power such as, for example, in laptop computers, calculators, digital wristwatches, or cellular telephones because the light source is typically a significant portion of the power consumed.

It is also known to place two sheets of light directing film adjacent one another with their prisms oriented approximately perpendicular to one another to further increase the amount of light directed approximately normal to the axis of the display. While this construction effectively increases the amount of on axis light exiting the display, the resulting structure may exhibit uneven light transmission across the surface area of the display under certain conditions. This uneven light transmission is typically manifested by visibly apparent bright spots, streaks, or lines on the surface of the display—a condition caused by optical coupling between contacting, or very nearly contacting, surfaces of the adjacent sheets of light directing film. Such visibly apparent variations in the intensity of transmitted light across the surface area of the display are undesirable.

These variations in intensity are particularly noticable in light redirecting films which have a well-defined 'cut-off' region such as the Brightness Enhancement Film manufactured by the Minnesota Mining and Manufacturing Company. This film exhibits a relatively sharp reduction in the intensity of transmitted light in specific angular ranges of deviation from an axis normal to the surface of the film. The angular ranges of relatively lower intensity light may be considered 'cut-off' regions. When the display is viewed 'on axis', the amount of light transmitted by optical coupling is small in relation to the total amount of light passing throught the film. By contrast, when the display is viewed along an axis which is within a 'cut-off' region, the amount of light transmitted by optical coupling is relatively larger in relation to the total amount of light passing through the film. Accordingly, the uneven light transmission is substantially more visible when viewed at an angular range which is within a cut-off region of the film.

One method reducing the visibility of optical coupling across the surface area of the films is to use a diffuser to scatter the light. However, this has the effect of reducing the amount of light which is directed normal to the surface of the display. This is considered undesirable in most circumstances.

There is, therefore, a need in the art for a light directing article for use in optical displays which reduces undesirable optical coupling between adjacent sheets of light directing film without sacrificing the optical performance of the article. There is also a need in the art for a light directing film construction which controls undesirable optical coupling between its structured surface and an adjacent surface.

SUMMARY

The present invention provides a novel construction for a light directing film having a first surface and an opposing structured surface which includes an array of prism elements. In a preferred embodiment, the array includes a repeating pattern of prism zones which includes at least a first zone having a plurality of prism elements which have their peaks disposed at a first distance above a reference plane and a second zone having a plurality of prism elements which have their peaks disposed at a lesser distance from the reference plane. The height of the prism elements in each zone may be tailored to achieve a desired optical performance objective. Additionally, the width of the respective zones may be tailored to achieve a desired optical performance objective. It is preferable, however, that the first zone be less than about 200 to 300 microns in width. A construction in accordance with this invention inhibits the occurrence of visible optical coupling when a second sheet of light directing film is placed closely adjacent to the film's structured surface by closely controlling the physical proximity of the two sheets. More specifically, this construction concentrates optical coupling in the first zones of the film, which preferably are sufficiently narrow to be virtually unresolvable by the human eye under normal viewing conditions. One significant advantage of the present invention over the prior art is that visible optical coupling is inhibited without substantially reducing the overall amount of light redirected toward an axis which is perpendicular to the surface of the film.

The present invention also encompasses a light directing article including at least one sheet of light directing film according to the present invention. The light directing article is preferably constructed by placing a second sheet of light directing film closely adjacent to the structured surface of a sheet constructed in accordance with the present invention with the prism elements of the first and second sheets disposed at a predetermined angle relative to one another. In practice, this predetermined angle typically measures between about 70 and 90 degrees and preferably about 90 degrees. Advantageously, a light directing article constructed in accordance with the present invention inhibits visibly apparent optical coupling without substantially reducing the amount of light redirected toward an axis which is normal to the surface of the article.

Other advantages of the present invention will be explained below with reference to the accompanying drawings.

DETAILED DESCRIPTION

Figure 1:
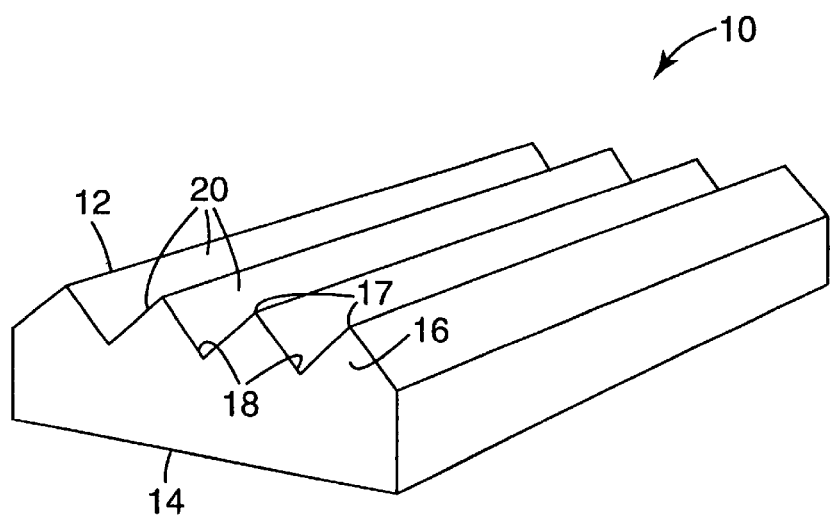
FIG. 1 is a perspective view of a representative embodiment of a light directing film in accordance with the prior art.

A representative example of a light directing film in accordance with the prior art is illustrated in FIG. 1. This film 10 may be manufactured from a suitable polymeric, acrylic, polycarbonate, UV-cured acrylate, or like material and has a smooth surface 14 and a structured surface 12 opposite the smooth surface. The structured surface 12 includes an array of linear prism elements 16 arranged side by side to form a plurality of peaks 17 and grooves 18 running the length of the film. In use, light which is incident upon the smooth surface 14 of this film at a relatively high incidence angles is refracted at the smooth surface 14 and the structured surface 12 of the film and is redirected toward an axis which is perpendicular to the smooth surface of the film. Additionally, light which strikes the structured surface 12 at greater than the critical angle undergoes total internal reflection from both side surfaces, or facets, 20 of a prism element 16 and is directed back into the display, where it may be recycled by a reflective surface. By a combination of refraction and total internal reflection, the film 10 increases the amount of light which is directed 'on axis' and decreases the amount of light which is directed 'off axis'.

Figure 2:
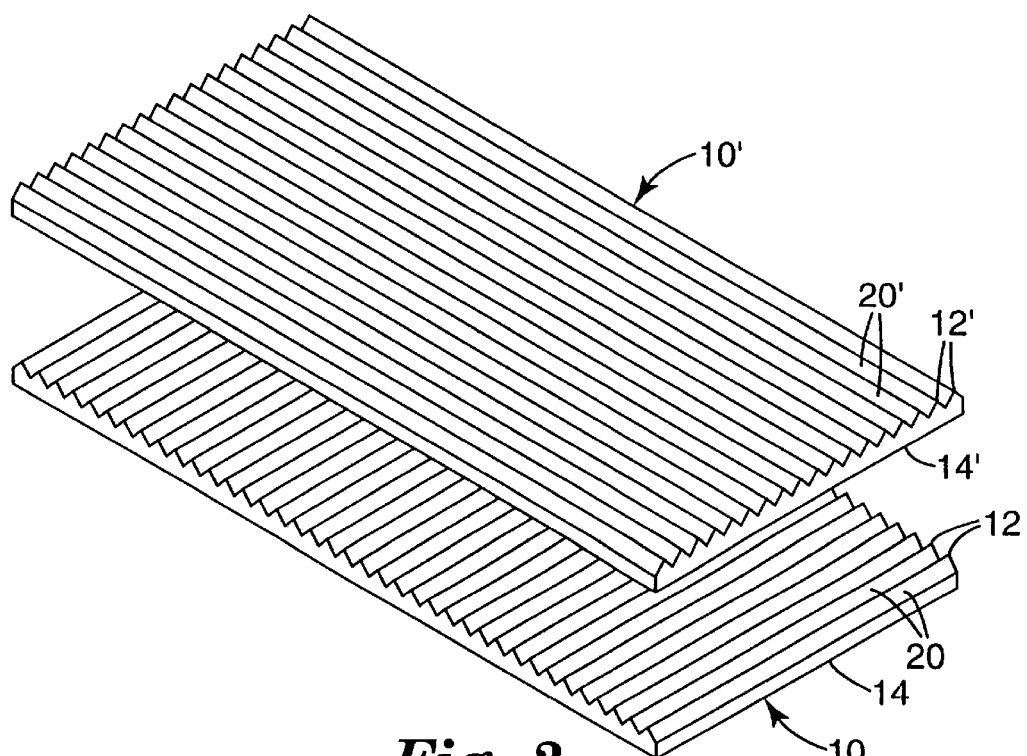
FIG. 2 is an exploded perspective view of a light directing article constructed from two sheets of the light directing film depicted in FIG. 1 placed adjacent one another and having their prism elements crossed at about 90 degrees.

As previously stated, it is known to place a second sheet of light directing film closely adjacent the first sheet with the prism elements crossed at approximately 90 degrees to further increase the amount of light directed approximately normal to the plane of the film. FIG. 2 illustrates, in an exploded view, the orientation of crossed sheets of light directing film. In use, the lower, smooth surface 14' of the upper sheet 10' is contacting, or very nearly contacting, the structured surface 12 of lower sheet 10.

FIGS. 3–6 illustrate representative embodiments of a novel construction for a light directing film in accordance with principles of the present invention. It should be noted that these drawings are not to scale and that, in particular, the size of the structured surface is greatly exaggerated for illustrative purposes. Although each of these embodiments may be used as a light directing film by itself, the disclosed films are particularly useful when crossed with a second sheet of light directing film to form a light directing article analogous to the article illustrated in FIG. 2.

Figure 3:
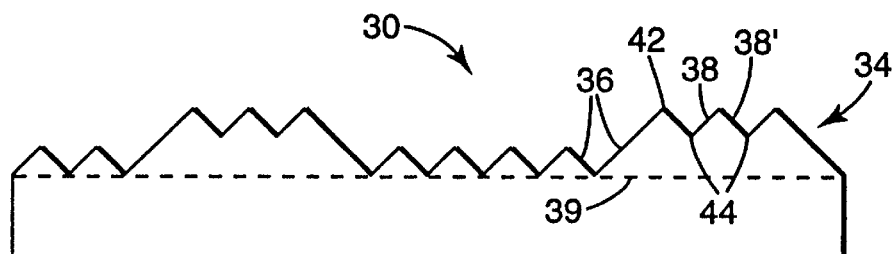
FIG. 3 is a cross-sectional view of one embodiment of a light directing film in accordance with the present invention which has prism elements of varying height.

Referring to FIG. 3, there is illustrated a representative cross-section of a portion of one embodiment of a light directing film in accordance with the present invention. The film 30 includes a first surface 32 and an opposing structured surface 34 which includes a plurality of substantially linearly extending prism elements 36. Each prism element 36 has a first side surface 38 and a second side surface 38', the top edges of which intersect to define the peak, or apex 42 of the prism element 36. The bottom edges of side surfaces 38, 38' of adjacent prism elements 36 intersect to form a linearly extending groove 44 between prism elements. In the embodiment illustrated in FIG. 3, the dihedral angle defined by the prism apex 42 measures approximately 90 degrees, however it will be appreciated that the exact measure of the dihedral angle in this and other embodiments may be varied in accordance with desired optical parameters. It is known in the art to use prism elements having dihedral angles which measure between 70° degrees and 110°.

The structured surface 34 of film 30 may be described as having a plurality of alternating zones of prism elements having peaks which are spaced at different distances from a common reference plane. The common reference plane may be arbitrarily selected. One convenient example of a common reference plane is the plane which contains first surface 32; another is the plane defined by the bottom of the lower most grooves of the structured surface, indicated by dashed line 39. In the embodiment illustrated in FIG. 3, the shorter prism elements measure approximately 50 microns in width and approximately 25 microns in height, measured from dashed line 39, while the taller prism elements measure approximately 50 microns in width and approximately 26 microns in height. Importantly, the width of the zone which includes the taller prism elements preferably measures between about 1 micron and 300 microns. By contrast, the width of the zone which includes the shorter prism elements is not critical and, in the disclosed embodiment, measures between 200 microns and 4000 microns. It is preferable, however, that in any given embodiment the zone of shorter prism elements be at least as wide as the zone of taller prism elements. It will be appreciated by one of ordinary skill in the art that the article depicted in FIG. 3 is merely exemplary and is not intended to limit the scope of the present invention. For example, the height or width of the prism elements may be changed within practicable limits—it is practicable to machine precise prisms in ranges extending from about 1 micron to about 175 microns. Additionally, the dihedral angles may be changed or the prism axis may be tilted to achieve a desired optical effect.

In use, when a second sheet of light directing film is placed adjacent structured surface 34, its physical proximity to sheet 30 is limited by the peaks of the taller prism elements. It has been determined that introducing a variation of as little as about 0.5 microns between the height of taller and shorter prism elements significantly inhibits the occurrence of undesired optical coupling in the zone of shorter prism elements. Thus, utilizing a variable height structured surface 34 to physically control the proximity of an adjacent surface dramatically reduces the surface area of structured surface 34 which is susceptible to undesired optical coupling. Instead, optical coupling occurs only within the zones which include the taller prism elements.

A second aspect of the present invention is that the width of the first zone is preferably less than about 200 to 300 microns. Under normal viewing conditions, the human eye has difficulty resolving small variations in the intensity of light which occur in regions less than about 200 to 300 microns in width. Thus, when the width of the first zone is reduced to less than about 200 to 300 microns, any optical coupling which may occur in this zone is not detectable to the human eye under normal viewing conditions.

Although a preferred embodiment of the present invention implements a variable height structured surface by varying the height of adjacent zones of prism elements, a variable height structured surface may also be implemented by varying the height of one or more prism elements along its linear extent to create alternating zones which include portions of prism elements having peaks disposed at varying heights above a common reference plane. Alternatively, these two features could be combined to produce a structured surface having alternating zones of relatively higher and lowe peaks along both dimensions.

Figure 4:
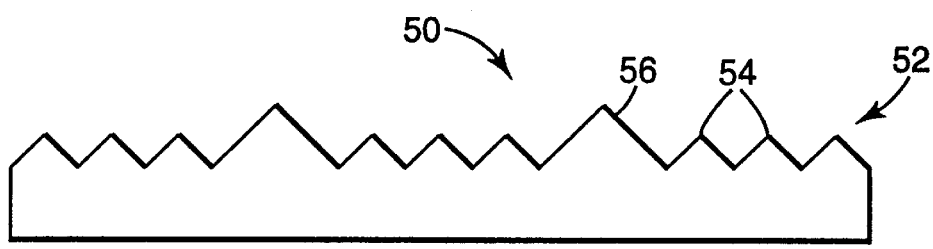
FIG. 4 is a cross-sectional view of another embodiment of a light directing film in accordance with the present invention which has prism elements of varying height.

FIG. 4 illustrates a second embodiment of the present invention which is similar to FIG. 3 except that the film 50 includes a structured surface 52 which has a zone of relatively shorter prism elements 54 separated by a zone including a single taller prism element 56. Much like the embodiment depicted in FIG. 3, the taller prism element limits the physical proximity of a second sheet of film to structured surface 52, thereby reducing the likelihood of a visible wet-out condition. It has been determined that the human eye is sensitive to changes in facet heights in light directing films and that relatively wide zones of taller prism elements will appear as visible lines on the surface of a film. While this does not materially affect the optical performance of the film, the lines may be undesirable in certain commercial circumstances. Reducing the width of a zone of taller prism elements correspondingly reduces the ability of a human eye to detect the lines in the film caused by the taller prism elements.

Figure 5:
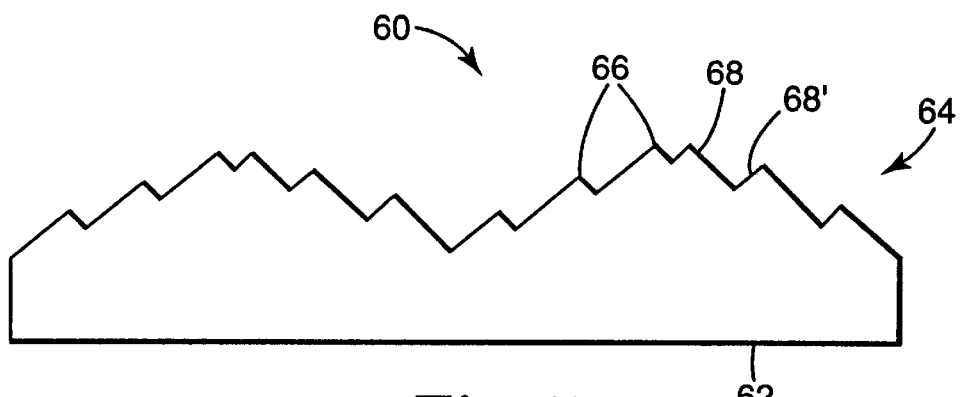
FIG. 5 is a cross-sectional view of another embodiment of a light directing film in accordance with the present invention.

FIG. 5 is a representative example of an embodiment of a light directing film in accordance with the present invention in which the prism elements are approximately the same size but are arranged in a repeating stair step or ramp pattern. The film 60 depicted in FIG. 5 includes a first surface 62 and an opposing structured surface 64 including a plurality of substantially linear prism elements 66. Each prism element has opposing lateral faces 68, 68' which intersect at their upper edge to define the prism peaks 70. The dihedral angle defined by opposing lateral faces 68, 68' measures approximately 90 degrees. In this embodiment the highest prisms may be considered a first zone and adjacent prisms may be considered a second zone. Again, the first zone preferably measures less than about 200 to 300 microns. Similar to the previously disclosed embodiments, the physical proximity of a second film placed closely adjacent structured surface 64 is limited by the highest peaks of the prism element which, in turn, reduces the likelihood of undesired optical coupling between the surfaces.

Figure 6:
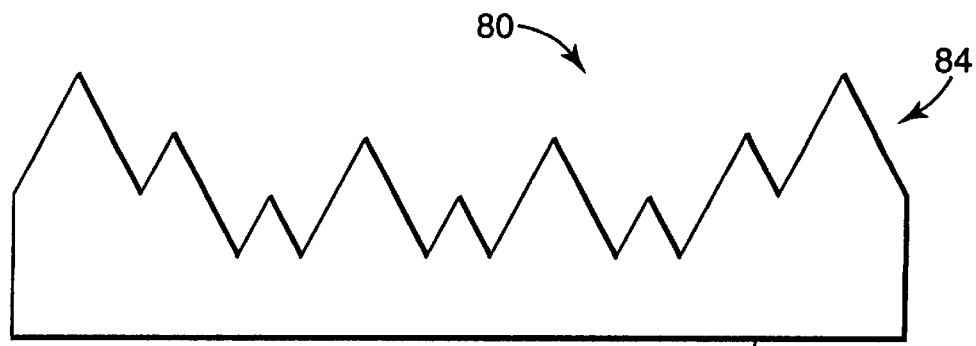
FIG. 6 is a cross-sectional view of an embodiment of the present invention in which the prism elements are of different heights and have their bases in different planes.

FIG. 6 illustrates a further embodiment of a light directing film in accordance with the present invention. The film 80 disclosed in FIG. 6 includes a first surface 82 and an opposing structured surface 84. This film may be characterized in that the second zone which includes relatively shorter prism elements contains prism elements of varying height. Similar to the previously disclosed embodiments, the film depicted in FIG. 6 inhibits undesired optical coupling in the second zone by controlling the physical proximity of a closely adjacent surface. The structured surface depicted in FIG. 6 has the additional advantage of substantially reducing the visibility to the human eye of lines on the surface of the film caused by the variations in the height of the prism elements.

Figure 7:
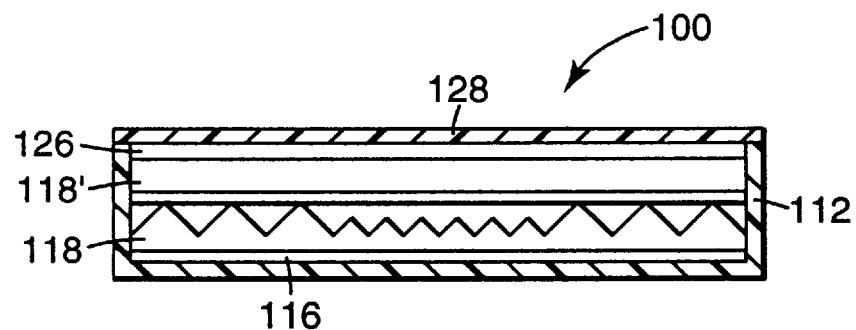
FIG. 7 is a cross-sectional view of an optical display including a light directing article in accordance with the present invention.

FIG. 7 illustrates, in cross-section, a representative embodiment of a display 100 incorporating a light directing article in accordance with the principles of the present invention. Display 100 includes a case 112, a light source 116, a first sheet of light directing film 118, a second sheet of light directing film 118', a light gating device 126, and a substantially transparent cover sheet 128. In the embodiment disclosed in FIG. 7 the light source 116 is an electroluminescent panel, however it will be appreciated that other light sources, such as, for example a fluorescent backlighting assembly commonly used with laptop computers or a passive reflective display commonly used in some calculators, are within the scope of the present invention. Additionally, while the light gating device 126 disclosed in FIG. 7 is preferably a liquid crystal device, other light gating devices are within the scope of the present invention.

Figure 8:
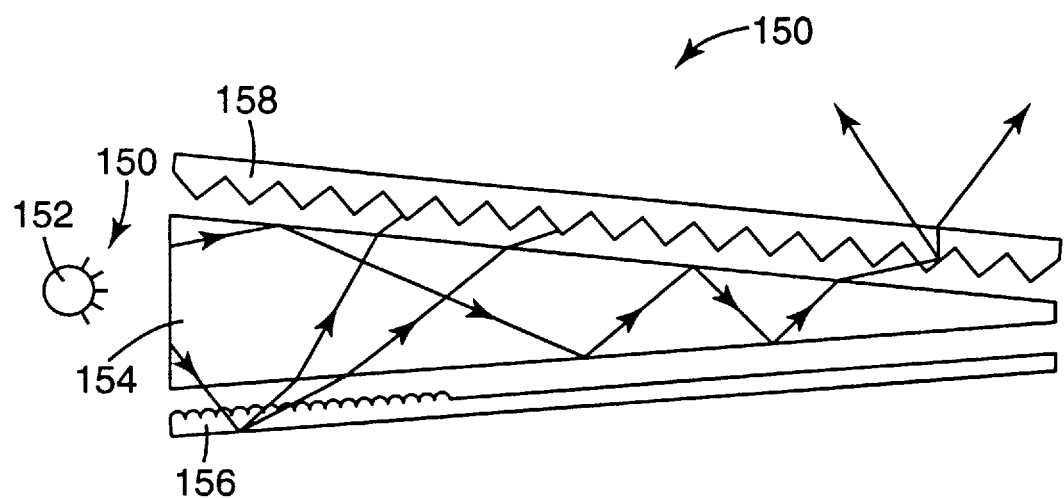
FIG. 8 is a cross-sectional view of a light guide assembly illustrating a second application of a film in accordance with the present invention.

The first sheet of light directing film 118 is exemplary of the embodiment illustrated in FIG. 3. It will be appreciated that FIG. 8 is not drawn to scale and that, in particular, the size of the structured surface of light directing film 118 is greatly exaggerated for illustrative purposes. As shown in FIG. 7, the higher peaks of the structured surface of light directing film 118 control the physical proximity of the second sheet of light directing film 118' to the first sheet 118. In accordance with the previous discussion, optical coupling is concentrated in the zones which have relatively higher peaks, which are preferably between about 50 and 300 microns in width.

FIG. 8 illustrates another useful application of a sheet of light directing film in accordance with the present invention. FIG. 8 is a schematic illustration of a commonly used light guide assembly 150 for use in an optical display. Light guide assembly 150 includes a light source 152, a wedge-shaped light guide 154, a diffusive reflector 156, and a sheet of light directing film 158. In use, light from the light source 152 is directed into light guide 154. Light rays which strike the surface of light guide 154 at greater than the critical angle undergo total internal reflection and are propagated along light guide 154. By contrast, light rays which strike the surface of light guide 154 at less than the critical angle are transmitted and refracted.

Light rays which exit the bottom surface of light guide 154 are reflected by diffusive reflector 156 and are "recycled" for use. Light rays which exit the top surface of light guide 154 are passed through a light gating means such as a liquid crystal device to produce an image on a display.

It is known to use a light directing film having its structured surface positioned adjacent light guide 154 as illustrated in FIG. 8 to increase the amount of an axis light leaving the light guide assembly 150. However, conventional light directing films, as depicted in FIG. 1, may allow optical coupling to occur between the structured surface of the light directing film and the upper surface of light guide 154. Light directing film 158 inhibits the occurrence of visible optical coupling by controlling the proximity of the structured surface of light directing film 158 to light guide 154.

Although the particular material used for the film may vary, it is essential that the material be substantially transparent to ensure high optical transmission. Useful polymeric materials for this purpose are commercially available such as, for example, acrylics and polycarbonates having nominal indices of refraction of about 1.493 and 1.586, respectively. Other useful polymers include polypropylene, polyurethane, polystyrene, polyvinyl chloride, and the like. While the particular material is not critical, materials having higher indices of refraction will generally be preferred.

Films in accordance with the present invention may be manufactured by various methods. Conventional methods include using a precision tool, such as a diamond turning tool, to cut a mold in a machinable substrate and replicating the mold using an embossing or UV curing process. Depending upon the manufacturing process, these films typically measure between 4 mils and 20 mils in thickness.

The following examples illustrate aspects of the present invention.

EXAMPLE 1

This example was conducted to determine whether the optical performance of a light directing film having a structured surface with periodically raised structures is similar to the optical performance of a light directing film having a structured surface with peaks of substantially the same height. To make this determination the optical performance of a sample sheet of standard light directing film, such as depicted in FIG. 1 was compared to the optical performance of two samples of the structured surface geometries discussed above. The results are presented in Table 1.

TABLE 1

| PATTERN | GAIN B1 | GAIN S1 | GAIN B2 | GAIN S2 | GAIN B3 | GAIN S3 | GAIN B4 | AVG. GAIN |
|---|---|---|---|---|---|---|---|---|
| SQUARE | 375.6 | 576.7 | 373 | 571.8 | 370.4 | 568.9 | 368.6 | 53.9% |
| TRIANGLE | 370.7 | 568.9 | 368.9 | 565.9 | 365.7 | 557.5 | 363.4 | 53.6% |
| STANDARD | 370.4 | 567.7 | 367.2 | 563.3 | 365.1 | 561.3 | 364 | 53.8% |
| SQUARE | 369.8 | 567.7 | 367.8 | 563.3 | 364.5 | 560.4 | 363.4 | 53.9% |
| TRI | 366 | 562.1 | 364.8 | 560.1 | 363.4 | 558.1 | 362.8 | 53.8% |
| STD | 365.4 | 561.3 | 364.2 | 559.5 | 363.1 | 556.6 | 361.9 | 53.8% |
| STD | 365.4 | 559.2 | 363.7 | 556.3 | 362.2 | 555.7 | 361.3 | 53.4% |
| TRI | 364 | 557.8 | 362.2 | 554.5 | 361.3 | 555.1 | 360.5 | 53.5% |
| SQUARE | 365.1 | 561.6 | 363.4 | 558.6 | 361.9 | 552.5 | 360.5 | 53.7% |
| AVERAGES | | | | | | | | |
| STD | 53.6% | | | | | | | |
| TRI | 53.6% | | | | | | | |
| SQUARE | 53.7% | | | | | | | |

The first experimental structured surface had successive zones of six tall prism elements, measuring about 200 microns in width, adjacent 61 rows of short prism elements as shown in the post pattern in FIG. 3. The second experimental structured surface was of a ramp configuration similar to that disclosed in FIG. 4. First, a luminance meter was used to measure the on-axis luminance (in candelas per square meter) at four different positions on a bare backlight. The results were recorded in the columns marked B1, B2, B3, and B4. Next a sheet of light directing film was placed on the backlight and the luminance meter was used to measure the on-axis luminance at the same four positions. The results were recorded in the columns marked S1, S2, S3, and S4. The average increase in on-axis luminance is expressed as a percent of the on-axis luminance in the column marked AVG. This procedure was repeated several times for each of the sheets of films and the results indicate that there is no significant change in optical performance between the structured surface geometries.

EXAMPLE 2

This example was conducted to determine the effects of a microstructured surface having periodic raised prism elements on the optical performance of a light directing article constructed by placing two sheets of light directing film closely adjacent one another with the respective prism elements oriented at approximately ninety degrees. Again, standard light directing film was compared with two samples of the structured surface geometries discussed above. The first experimental structured surface had successive zones of six relatively taller prism elements, measuring about 200 microns in width, adjacent 61 rows of short prism elements. The second experimental structured surface was of a ramp configuration similar to that disclosed in FIG. 4. First, a luminance meter was used to measure the on-axis luminance (in candelas per square meter) at five different positions on a bare backlight corresponding to the four corners and the center of the light. Next, two crossed sheets of standard light directing film were placed on the backlight and the on axis luminance was measured at the same five points. This procedure was repeated for two crossed sheets of the experimental structured surfaces. The luminance values (in candelas per square meter) in the five different measurement points are as follows:

TABLE 2

| | MEASUREMENT POINT | | | | |
|---|---|---|---|---|---|
| Configuration | 1 | 2 | 3 | 4 | 5 |
| Bare Backlight | 1150 | 1129 | 1177 | 1010 | 937.5 |
| Standard Film (FIG. 1) | 2262 | 2274 | 2232 | 1952 | 1834 |
| Ramp Pattern (FIG. 4) | 2248 | 2249 | 2306 | 1941 | 1813 |
| Post Pattern (FIG. 3) | 2267 | 2242 | 2266 | 1957 | 1837 |

The increase in luminance resulting from the use of the film may be expressed as a multiple of the luminance measurement for the bare backlight, frequently referred to as the 'gain' resulting from use of a light directing film, as follows:

TABLE 3

| | MEASUREMENT POINT | | | | | |
|---|---|---|---|---|---|---|
| Configuration | 1 | 2 | 3 | 4 | 5 | AVG. |
| Standard Film (FIG. 1) | 1.97 | 2.01 | 1.90 | 1.93 | 1.96 | 1.95 |
| Ramp Pattern (FIG. 3) | 1.95 | 1.99 | 1.96 | 1.92 | 1.93 | 1.95 |
| Post Pattern (FIG. 4) | 1.97 | 1.99 | 1.93 | 1.94 | 1.96 | 1.96 |

Accordingly, the optical performance of a light directing article constructed from two crossed sheets of light directing film was not reduced by incorporating a raised structure into the structured surface of the film.

The samples were also evaluated to assess the impact of the experimental structured suraces on wet-out. The crossed sheets of film were placed between glass plates to apply a relatively even pressure across the surface area of the sheets. The glass plates were then placed on top of a lightbox and the films were analyzed to observe the wet-out patterns. Consistent with prior practice, the wet-out pattern of the standard light directing film, corresponding to FIG. 1, appeared as random areas of relatively higher intensity over the surface of the film. However, the wet-out pattern of the experimental surfaces appeared as very faint lines coincident with the the zones of relatively higher prisms. By reducing the width of these zones, it is expected that the wet-out pattern will be rendered unresolvable by the human eye under normal viewing conditions.

What is claimed is:

1. A light directing film comprising a first surface;
a structured surface opposite said first surface and having an array of prism elements, each prism element having opposing facets which intersect at a peak, said array including a repeating pattern of prism zones, the pattern including at least:
a first zone that measures less than about 300 microns in width and comprising a first prism element having a peak defining a first dihedral angle and disposed at a first distance from a reference plane disposed between the structured surface and the first surface; and
a second zone that measures between 200 and 4000 microns in width adjacent said first zone and comprising a second prism element having a peak defining a second dihedral angle substantially equal to the first dihedral angle and disposed at a second distance from the reference plane, said second distance being less than said first distance, whereby, when the structured surface of said light directing film is placed adjacent a planar surface, optical coupling occurs primarily in said first zone.

2. The light directing film of claim 1, wherein:
said first distance measures between 1 micron and 175 microns.

3. The light directing film of claim 1, wherein:
said second distance measures between 0.5 microns and 174.5 microns.

4. The light directing film of claim 1, wherein:
said second distance is at least about 0.5 microns less than said first distance.

5. The light directing film of claim 1, wherein:
said second distance is less than said first distance by at least about 1.0 wavelength of light.

6. The light directing film of claim 1, wherein:
said second distance is less than said first distance by at least about 2.0 wavelengths of light.

7. The light directing film of claim 1, wherein:
said second distance is between about 33 and 95 percent of said first distance.

8. The light directing film of claim 1, wherein:
said second zone includes a plurality of prisms having peaks disposed at different heights above the reference plane.

9. A light directing article comprising:
a first sheet of light directing film having a first surface and a structured surface opposite said first surface, said structured surface including a linear array of prism elements oriented along a first major axis, said array including a repeating pattern of prism zones, the pattern including at least a first zone that measures less than about 300 microns in width comprising a first prism element having a peak defining a first dihedral angle and disposed at a first distance from a reference plane and a second zone that measures between 200 and 4000 microns in width adjacent said first zone and comprising a second prism element having a peak defining a second dihedral angle substantially equal to the first dihedral angle and disposed at a second distance from the reference plane which is less than said first distance, the reference plane being disposed between the structured surface and the first surface;
a second sheet of light directing film having a substantially planar surface disposed adjacent said first sheet of light directing film and having a structured surface opposite said substantially planar surface having a linear array of prism elements oriented along a second major axis;
said first major axis intersecting said second major axis within a predetermined angular range, whereby, optical coupling between said first sheet and said second sheet occurs primarily in said first zone.

10. An optical display, comprising:
a light source;
a viewing screen;
light transfer means for directing light from said light source to said viewing screen, said light transfer means including at least a first sheet of light directing film, said film including a first surface and a structured surface opposite said first surface and having an array of prism elements, each prism element having opposing facets which intersect at a peak, said array including a repeating pattern of prism zones, said pattern including at least:
a first zone that measures less than about 300 microns in width and comprising at least a first prism element having a peak defining a first dihedral angle and disposed at a first distance from a reference plane located between the structured surface and the first surface; and
a second zone that measures between 200 and 4000 microns in width adjacent said first zone and comprising at least a second prism element having a peak defining a second dihedral angle substantially equal to the first dihedral angle and disposed at a second distance from the reference plane, said second distance being less than said first distance, whereby, when the structured surface of said light directing film is placed adjacent a planar surface, optical coupling occurs primarily in said first zone.

* * * * *